United States Patent [19]

Whittley

[11] Patent Number: 5,258,988
[45] Date of Patent: Nov. 2, 1993

[54] RAMAN LASER

[75] Inventor: Stewart T. Whittley, Edinburgh, United Kingdom

[73] Assignee: GEC Ferranti Defence Systems Limited, Stanmore, United Kingdom

[21] Appl. No.: 914,238

[22] Filed: Jul. 17, 1992

[30] Foreign Application Priority Data

Jul. 18, 1991 [GB] United Kingdom ............... 9115556
Nov. 8, 1991 [GB] United Kingdom ............... 9123754

[51] Int. Cl.$^5$ ............................................. H01S 3/30
[52] U.S. Cl. ............................................. 372/3
[58] Field of Search ............... 372/3, 71, 99; 359/327, 359/334

[56] References Cited

U.S. PATENT DOCUMENTS

| | | | |
|---|---|---|---|
| 4,618,783 | 10/1986 | Pradere | 372/3 |
| 4,751,714 | 6/1988 | Chen | 372/3 |
| 4,829,528 | 5/1989 | Band et al. | |
| 5,058,117 | 10/1991 | Shoshan | 372/3 |
| 5,090,016 | 2/1992 | Dewhirst et al. | 372/3 |
| 5,105,428 | 4/1992 | Pocholle et al. | 372/3 |
| 5,180,378 | 1/1993 | Kung et al. | 372/3 |

FOREIGN PATENT DOCUMENTS

| | | |
|---|---|---|
| 0042521 | 12/1981 | European Pat. Off. |
| 0393528 | 10/1990 | European Pat. Off. |
| WO8602784 | 5/1986 | PCT Int'l Appl. |
| 1210597 | 10/1970 | United Kingdom |
| 1418299 | 12/1975 | United Kingdom |
| 2151869 | 7/1985 | United Kingdom |

OTHER PUBLICATIONS

"Raman laser utilizing rotational levels of hydrogen with a ring resonator" Soviet Journal of Quantum Elec. 18 (10) Oct. 1988 pp. 1280–1282.
"A Self-Seeded SRS System for the Generation of 1.54 um Eye-Safe Radiation" Optics Communications 75, No. 2 Feb. 15, 1990, pp. 173–178.

Primary Examiner—Rodney B. Bovernick
Assistant Examiner—Robert E. Wise
Attorney, Agent, or Firm—Spencer, Frank & Schneider

[57] ABSTRACT

The present invention provides a Raman laser wherein hazardous radiation from a pump laser source 20 is focused by lens 25 via a cell 27 containing a Raman active medium before passing to a absorbing beam dump 30. Lasing action is maintained within the cell 27 by the action of mirrors 29 and 26 which are respectively totally and partially reflective to radiation generated at the Raman wavelength, and which are both transmissive to the pump beam. A Raman beam exits the cell via partially transmissive mirror 26 is refocused by lens 25 and passes through to the output of the device 31. This configuration provides a Raman laser where the "eyesafe" Raman beam is generated in a backwards direction relative to the pump beam, so that during normal operation, or in the event that the optics breakdown, or conversion does not take place within the cell, the output beam would not be contaminated by potentially harmful wavelengths at a hazardous level.

9 Claims, 1 Drawing Sheet

RAMAN LASER

BACKGROUND OF THE INVENTION

This invention relates to a Raman Laser and in particular, but not exclusively to a Raman Laser which provides "eyesafe" radiation.

Many applications of lasers, such as rangefinding surveying, communication, terrain following, wire-avoidance etc. require eyesafe laser sources before they can be freely employed. One of the most successful class of solid state lasers utilises the neodymium ion as the lasing species. Although efficient, this laser normally has a wavelength around 1 μm, an eye hazard at useful operating powers and repetition rates. However this can be frequency shifted to an eyesafe region of the spectrum around 1.5 μm by the Raman Effect, first observed by Sir Chandrasekhara Vankata Raman in 1928.

The Raman Effect occurs when energy in the form of photons incident on a molecular structure raises the energy state of a molecule to an intermediate, or virtual state, from which it makes a Stokes transition emitting a photon of energy, termed a scattered photon. The scattered photon may have the same energy as the incident photon or alternatively a higher or lower energy, (frequency), having been "Raman shifted". For example, Raman shifting the Nd:YAG laser in methane gas generates a laser beam at 1.54 μm. Likewise shifting in deuterium gas generates a laser beam at 1.56 μm.

A Raman laser, employing the Raman effect, can be created by passing a laser beam, known as the pump beam, through a cell containing a Raman active medium. At lower powers the pump beam is normally focused to increase the power density within the Raman active medium, thereby enhancing the interaction, which is nonlinear, and increasing the conversion efficiency. Many other geometries are also possible, including collimated and waveguide configurations.

The Raman conversion process is typically around 40% efficient. Raman scattering is an inelastic process, i.e. energy is deposited in the Raman medium at the end of the interaction. Some 30% of the pump energy is deposited in the gas during vibrational Raman scattering in methane. The residual pump light which is unconverted exits the cell and presents a remaining eye hazard.

Guaranteeing that a Raman shifted laser is eyesafe is difficult. The design must be such that any hazardous light is eliminated or is kept below an acceptable power level at the exit of the system. This must be the case even if the Raman laser should fail for any reason, allowing the pump beam to pass through unmodified, or if the optics employed are imperfectly manufactured or get damaged.

In order to better understand the problems associated with present Raman lasers, these shall be discussed with reference to FIG. 1, which depicts a common Raman laser arrangement using longitudinal pumping. In this arrangement the laser source 1, which may be a Nd:YAG laser, produces a pump beam 2. This passes through mirror 3, (which is transmissive to the pump beam wavelength but reflective to the Raman shifted wavelength), to cell 4, containing a Raman medium 5, where part of the pump beam is frequency shifted. The Raman and residual pump beams 6 then exit the cell 4 and pass through a Raman output coupler 7, (which is a partial reflector at the wavelength of the Raman beam, and totally transmissive to the residual pump beam). This coupler is spaced relative to mirror 3 such that it forms a resonator and causes stimulated emission within the cell 4 of Raman photons. Lens element 8 is provided in order to focus the radiation within the cell to increase the conversion efficiency as mentioned above. The Raman and residual pump beams exit at 10 have been refocused by lens 9 and are then separated and filtered by dielectric coated beam splitters (not shown), and/or bulk absorbers (e.g. silicon). Such methods are less than perfect because dielectric mirrors/splitters can be imperfectly made, for example they may contain pinhole defects, and both splitters and bulk absorbers suffer stress at high incident beam intensities and may fail. Also a method known as Four Wave Mixing can generate other hazardous wavelengths in the forward direction when, as in this simple geometry, the pump and Raman beams are co-propogating. The splitters and bulk absorbers must also cope with these.

It is important to minimise intensities wherever possible in the simple longitudinally pumped Raman laser design as described above, because if the Raman laser fails for any reason (e.g. loss of gas, misalignment of Raman resonator, damage to Raman resonator optics etc.) then the pump beam is unconverted. It will be appreciated from FIG. 1, that if this happens the hazardous radiation increases some threefold at the outlet of the system, increasing stress on the output protective optics and/or bulk absorber, and increasing the risk of unwanted radiation escaping.

The object of the present invention is to provide a Raman laser which overcomes the above mentioned problems.

SUMMARY OF THE INVENTION

According to the present invention there is provided an axially pumped Raman laser comprising:

a pump laser source for providing a pump beam along an optical path; a first optical element in the optical path transmissive to the pump beam and partially reflective to Raman shifted radiation of a desired wavelength;

a second optical element in the optical path transmissive to pump beam and reflective to the Raman shifted radiation of a desired wavelength;

a beam dump for recieving the pump beam passing through the second optical element;

and a cell for containing a Raman active gas, wherein said two optical elements form a resonator within the Raman active gas and wherein the Raman shifted radiation is output from the resonator through said first optical element.

An arrangement in accordance with the invention provides a Raman beam which is output in a different direction to the residual pump beam. This avoids the problems associated with filtering the output to obtain the Raman beam alone as is necessary with previous arrangements. This also reduces the problems associated with failure of components in such prior art arrangements.

In the above arrangement Raman conversion takes place and the hazardous residual pump beam, which is unwanted, exits the cell and is absorbed in the beam dump. The Raman beam exits the cell in the reverse direction relative to the pump beam, and can be directed to the output of the system. In this arrangement the "eyesafe" Raman radiation is generated in the opposite direction to the incident hazardous pump beam.

Should the Raman laser fail for any reason, such as those detailed above, then the increased hazardous radiation is absorbed in the beam dump (e.g. ceramic or KG3 glass). This dump can be capable of handling very great stress levels. Furthermore the stress levels on the output optics are actually reduced during a failure mode.

Preferably the Raman laser further comprises a lens element for focusing the pump beam in the cell. This increases the power density within the cell enhancing the nonlinear interaction and thereby increasing the conversion efficiency. It is also advantageous if a beam splitter is employed arranged to direct the Raman beam emerging from the cell of the optical path extending from the pump source to the cell. This prevents the Raman beam being directed back to the laser source.

A problem in Raman shifting in methane is that the Raman scattering competes with a process known as Stimulated Brillouin Scattering (SBS). The SBS interaction can backscatter some of the hazardous pump beam in the same direction as the output beam. The Raman laser design can be chosen to eliminate this competing process almost entirely but some low levels of hazardous radiation may still remain. Also, the Raman mirrors and input optics will backscatter some small, but worrying, amounts of hazardous radiation.

In order to overcome the problems mentioned immediately above it is advantageous if the pump beam is circularly polarized prior to being incident on the cell, for then any backscattered pump light, either due to SBS or Fresnel reflection from Raman optics (or possibly damaged optics), will return with the opposite rotation of circular polarisation, and this can be removed by including a beam splitter and quarter wave plate in the path of the Raman beam. The wave plate can be designed to act as a quarter wave plate for the pump beam but to be neutral to the Raman beam, this is aided by the near half integral relationship of the pump to Raman wavelengths of 1.06 μm to 1.54 μm encountered in many applications.

Any hazardous light frequencies being generated by Four Wave Mixing will be generated primarily in the backwards direction and will be absorbed in the beam dump.

Another important benefit occurs from the use of circularly polarized pump laser light. Packaging of Raman cells into short lengths is generally desired but is often restricted because power densities on optics increase as the cell is made shorter in a tight focused design. If linearly polarized pump light were used then a standing wave could be established in the Raman resonator. The electric fields of the forward and backward travelling Raman beams within the Raman resonator would interfere constructively with each other, the two field strengths would add at certain points, and the intensity would be four times that of a single beam. This can be particularly problematic within the dielectric coatings of the Raman resonator mirrors, leading to high stress and possible failure. However, if the pump beam is made circularly polarized then the Raman beam is also generated circularly polarized. No standing wave is established within the Raman resonator and the intensities are lower by a factor of two.

DETAILED DESCRIPTION OF THE DRAWINGS

Figure 1:
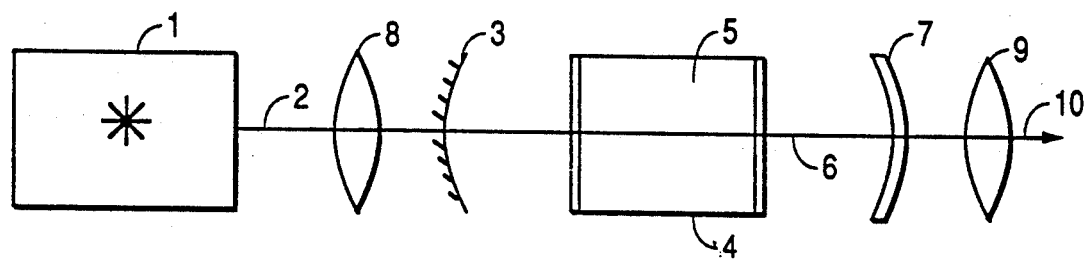
FIG. 1 depicts a prior art Raman laser arrangement described above.
Figure 2:
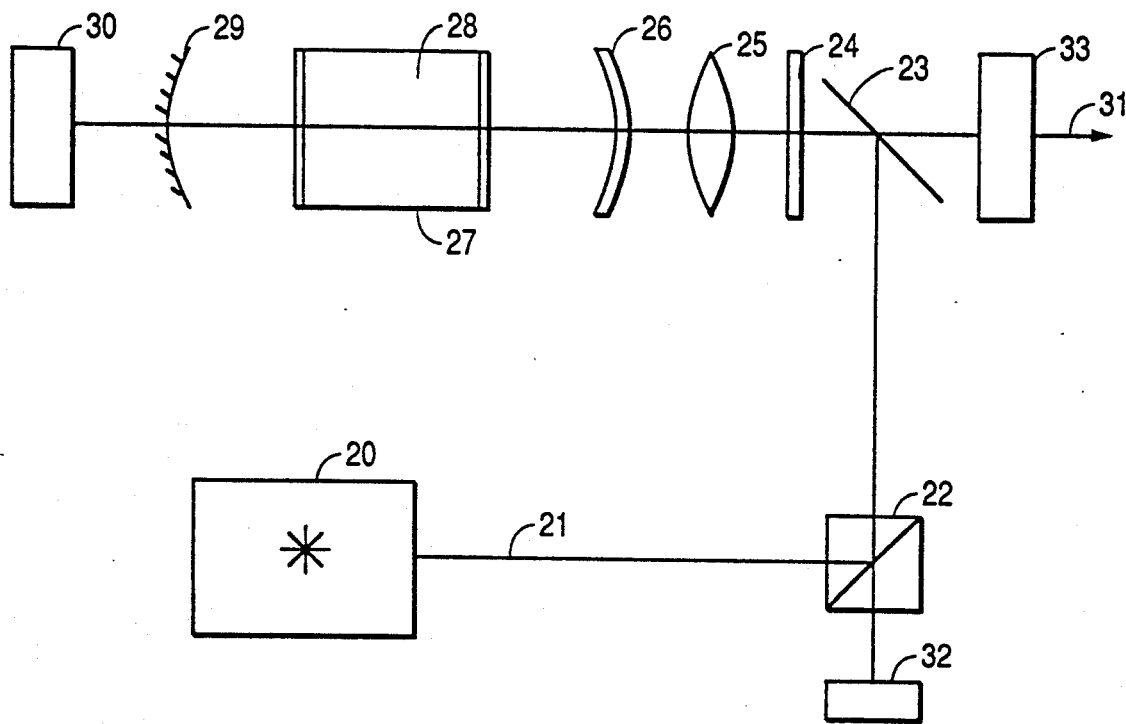
FIG. 2 is a schematic illustration of a Raman laser in accordance with one embodiment of the present invention for providing eyesafe indication. This is given by way of example only and is described below.

The arrangement of FIG. 2 comprises a Nd:YAG laser 20 which provides a pump beam 21 of wavelength 1 μm. This pump beam is polarized by polarizer 22 and is directed by beam splitter 23 through a quarter wave plate 24 such that it is circularly polarized. The beam is then focused by the lens 25 and passes through a mirror 26, (which is nominally 100% transmissive to the pump wavelength), through a cell 27 containing methane gas 28, through a mirror 29, (which again, is totally transmissive to the pump beam), to an absorbing beam dump 30.

The pump beam on passing through the cell 27 causes excitation of the methane molecules to an intermediate state, from where they undergo a Stokes transition which causes then to emit photons of a different wavelength, producing the Raman beam. The mirror 29 is totally reflective to the Raman beam generated, and the mirror 26 is partially reflective to the Raman beam generated causing lasing action within the cavity. The Raman beam exits through the mirror 26. This beam is refocused by the lens 25 and passes unaffected through plate 24, (which is not a quarter wave plate to the Raman beam as the wavelength of this beam is considerably different from that of the pump beam). The Raman beam then passes to an output 31 via beam splitter 23, which is dielectrically coated to pass Raman shifted light but to reflect hazardous light, and then through a silicon bulk absorber 33 which removes any small remaining intensities of hazardous radiation.

In the cell 27 there also occurs Stimulated Brillouin Scattering (SBS) which backscatters some of the hazardous pump beam in the same direction as the output beam. Also some components of the pump beam are reflected by the optics. However, because this backscattered radiation has undergone a reflection, it is circularly polarized in the opposite sense to the pump beam, and when passing through the quarter wave plate becomes plane polarized and is prevented from passing to the output 31 by beam splitter 23 and is further prevented from reaching the pump laser by polarizer 22 permitting it to be absorbed by beam dump 32.

What I claim is:
1. An axially pumped Raman laser comprising:
   a pump laser source for providing a pump beam along an optical path;
   a first optical element in the optical path transmissive to the pump beam and partially reflective to Raman shifted radiation of a desired wavelength;
   a second optical element in the optical path transmissive to pump beam and reflective to the Raman shifted radiation of a desired wavelength;
   a beam dump for receiving the pump beam passing through the second optical element; and
   a cell for containing a Raman active gas, wherein said two optical elements form a resonator within the Raman active gas and wherein the Raman shifted radiation is output from the resonator through said first optical element.
2. A Raman laser as claimed in claim 1 further comprising a lens element for focusing the pump beam in the cell.

3. A Raman laser as claimed in claim 1 further comprising a beam splitter arranged to direct the Raman beam emerging from the cell off the optical path extending from the pump laser source to the cell.

4. A Raman laser as claimed in claim 1 wherein the pump beam is circularly polarized prior to being incident on the cell.

5. A Raman laser as claimed in claim 1 further comprising a beam splitter and a quarter wave plate in the path of the Raman beam.

6. A Raman laser as claimed in claim 5 wherein optical elements are arranged such that the pump beam and the Raman beam are circularly polarized in opposite senses.

7. A Raman laser as claimed in claim 6 wherein the wavelength of the Raman beam is substantially a half of an integral multiple of the pump beam wavelength.

8. A Raman laser as claimed in claim 1 wherein the Raman active medium is methane or deuterium.

9. A Raman laser as claimed in claim 1 wherein the wavelength of the pump beam is dangerous to the eyes and wherein the wavelength of the Raman beam is "eyesafe".

* * * * *